US006278256B1

(12) United States Patent
Aoyama

(10) Patent No.: US 6,278,256 B1
(45) Date of Patent: *Aug. 21, 2001

(54) ELECTRIC VEHICLE CONTROL SYSTEM FOR CONTROLLING A PERMANENT MAGNET MOTOR WHICH DRIVES THE ELECTRIC VEHICLE

(75) Inventor: Ikuya Aoyama, Tokyo (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/571,298

(22) Filed: Dec. 12, 1995

(30) Foreign Application Priority Data

Dec. 21, 1994 (JP) .................................................. 6-317831

(51) Int. Cl.⁷ .......................................................... H02P 7/42
(52) U.S. Cl. .............................................. 318/801; 361/23
(58) Field of Search .................................... 318/798–815, 318/434; 361/23, 33, 31, 79, 91, 104, 106; 363/50, 55, 56, 54; 307/31, 35

(56) References Cited

U.S. PATENT DOCUMENTS

| 3,887,860 | * | 6/1975 | Bernhardt et al. ...................... 307/31 |
| 4,361,791 |   | 11/1982 | Plunkett . |
| 4,475,150 | * | 10/1984 | D'Atre et al. .......................... 363/51 |
| 4,484,127 | * | 11/1984 | Salihi et al. .......................... 318/802 |
| 4,546,423 | * | 10/1985 | Seki ........................................ 363/56 |
| 4,684,868 | * | 8/1987 | Dadpey et al. ....................... 318/802 |
| 4,803,592 | * | 2/1989 | Ashley .................................... 361/79 |
| 5,304,912 | * | 4/1994 | Kajiwara et al. ..................... 318/802 |
| 5,315,225 | * | 5/1994 | Heinrich et al. ...................... 318/712 |
| 5,504,414 | * | 4/1996 | Kinoshita ............................... 320/15 |
| 5,629,603 | * | 5/1997 | Kinoshita ............................... 320/11 |

FOREIGN PATENT DOCUMENTS

| 0 371 427 |   | 6/1990 | (EP) . |
| 0 588 628 |   | 3/1994 | (EP) . |
| 4-46502   | * | 2/1992 | (JP) . |

OTHER PUBLICATIONS

Patent Abstracts of Japan, vol. 10, No. 253 (M–512) [2309], Aug. 29, 1986, JP–A–61–081102, Apr. 24, 1986.

* cited by examiner

*Primary Examiner*—Jonathan Salata
(74) *Attorney, Agent, or Firm*—Oblon, Spivak, McClelland, Maier & Neustadt, P.C.

(57) ABSTRACT

An electric vehicle control system for controlling an electric vehicle. The electric vehicle control system includes an inverter adapted to receive DC power from an overhead power line for converting the DC power into three-phase AC power, a permanent magnetic synchronous motor connected to receive the three-phase AC power from the inverter for driving the electric vehicle, a control device for generating an opening signal based on a malfunction signal from the inverter or an operating instruction, and an opening device connected to receive the opening signal from the control device for opening the connection between the inverter and the permanent magnetic synchronous motor.

5 Claims, 4 Drawing Sheets

ELECTRIC VEHICLE CONTROL SYSTEM FOR CONTROLLING A PERMANENT MAGNET MOTOR WHICH DRIVES THE ELECTRIC VEHICLE

BACKGROUND OF THE INVENTION

1. Field of the Invention

This invention relates to an electric vehicle control system, and more particularly to an electric vehicle control system which controls a permanent magnet synchronous motor for driving an electric vehicle.

2. Description of the Related Art

In order to run an AC motor driven electric vehicle controlled by variable voltage variable frequency inverters ("inverters") smoothly, the electric vehicle control system should be designed in such a way that even if, by chance, an inverter should malfunction, it is possible to continue driving the electric vehicle by opening the malfunctioning part.

In general, a 3-phase induction motor is typically used as an electric vehicle drive motor. However, recently an electric vehicle has been developed which is driven by permanent magnet synchronous motors ("PM motors") supplied respectively with 3-phase AC power from inverters. PM motors can be broadly divided into two types. The first type are PM motors having a surface magnet structure in which permanent magnets are attached to the rotor surface of the motor. The second type are PM motor having a buried magnet structure in which permanent magnets are buried inside the rotor. PM motors are superior in maintainability, controllability and ability to withstand the environment, and are capable of being operated with high efficiency and high power factor as compared to other types of motors. Therefore, PM motors possess desirable characteristics and features as electric vehicle drive motors.

FIG. 2 is a schematic diagram of a prior art electric vehicle control system which controls one PM motor 5 with one inverter 3. DC power collected from an overhead power line (not illustrated) via a pantograph 1 passes through a line breaker 2 which switches the current ON and OFF. The DC power is, then, converted to a variable voltage variable frequency AC power by the inverter 3, and is supplied to the PM motor 5. A control device 4 receives information P from sensors (not illustrated) mounted in inverter 3 and information R, such as a speed of revolution and an angle of rotation of PM motor 5. Then, based on information R, control device 4 calculates an inverter frequency and a motor voltage, and outputs these as a control signal C. Inverter 3 is controlled based on this control signal C. Inverter 3 is composed of self-turn-off semiconductor devices 3a–3f ("semiconductor devices"), such as GTO thyristors or IGBTs, which are capable of being controlled by control signal C from control device 4 so as to be placed conductive or non-conductive states with predetermined timing. Diodes 31 are respectively connected in an antiparallel fashion with the self-turn-off semiconductor devices 3a–3f.

FIG. 3 is a drawing showing the operation in the prior art electric vehicle control system shown in FIG. 2 when semiconductor device 3a of semiconductor devices 3a–3f malfunctions so as to be in a state of constant conduction. When semiconductor device 3a is in a conduction malfunction state, inverter 3 cannot supply 3-phase AC power to PM motor 5. When control device 4 detects the conduction malfunction of semiconductor device 3a via information P from sensors mounted in inverter 3, control device 4 outputs an opening instruction al to line breaker 2. Therefore, the operation of inverter 3 is stopped by placing the line breaker 2 into an open state. In this case, generally, the electric vehicle continues to be operated with 3-phase AC power supplied to other PM motors 5 from other fault-free electric vehicle control systems, respectively. However, when the electric vehicle continues to be operated, the rotor of PM motor 5 connected to malfunctioning inverter 3 continues to rotate. Since PM motor 5 is composed of permanent magnets, a magnetic flux is generated inside PM motor 5, even when AC power is not supplied from inverter 3, and PM motor 5 operates as a generator. At this time, if all of semiconductor devices 3a–3f are in a fault-free state, the system is designed such that the current does not continue to flow from PM motor 5. However, when semiconductor devices 3a has a conduction malfunction, short-circuit currents flow between the phases of PM motor 5 via the routes shown by the arrows in FIG. 3. Therefore, a problem arises that, if the electric vehicle continues to be operated in this state, it may result in PM motor 5 burning out through overcurrent and overheating due to the short-circuit currents.

In a prior art electric vehicle control system such as described above, when any semiconductor device of an inverter has a conduction malfunction, the power supply from the overhead supply line side to the malfimctioning inverter is cut off by the line breaker and the electric vehicle continues to be operated by other fault-free electric vehicle control systems.

However, short-circuit currents continue flow in the PM motor via the malfunctioning inverter. As a result, there arises the problem of burn-out of the PM motor. Therefore, the problem arises that the operation of the electric vehicle itself cannot be continued, and thus commercial operation thereof will be hindered.

SUMMARY OF THE INVENTION

Accordingly, one object of this invention is to provide an electric vehicle control system which can continue the operation of the electric vehicle even in a case when an inverter of the electric vehicle control system is in a malfunction state.

Another object of this invention is to provide an electric vehicle control system which, even in a case when an inverter of the electric vehicle control system is in a malfunction state, can protect the malfunctioning inverter and a PM motor connected to the malfunctioning inverter for driving the electric vehicle.

Still another object of this invention is to provide an electric vehicle control system which can prevent unnecessary current from flowing into the inverter when at least one of the inverters is stopped by an operating instruction during the electric vehicle operation.

These and other objects of this invention can be achieved by providing an electric vehicle control system for controlling an electric vehicle. The electric vehicle control system includes an inverter adapted to receive DC power from an overhead power line for converting the DC power into three-phase AC power, a permanent magnetic synchronous motor connected to receive the three-phase AC power from the inverter for driving the electric vehicle, a control device for generating an opening signal based on one of a malfunction signal of the inverter and an operating instruction, and an opening device connected to receive the opening signal from the control device for opening the connection between the inverter and the permanent magnetic synchronous motor.

In another aspect of the present invention, when an inverter is malfunctioning or when the operation of an inverter is stopped via an operating instruction, the permanent magnet synchronous motor connected to that inverter can be electrically opened. Therefore, the operation of the electric vehicle can be continued by other electric vehicle control systems. Thus, interference with commercial operation can be prevented. Also, the sum of the 3-phase currents is always zero. Therefore, even by providing opening devices in at least two phase output lines out of three phase output lines, current can be prevented from flowing in the remaining one phase.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
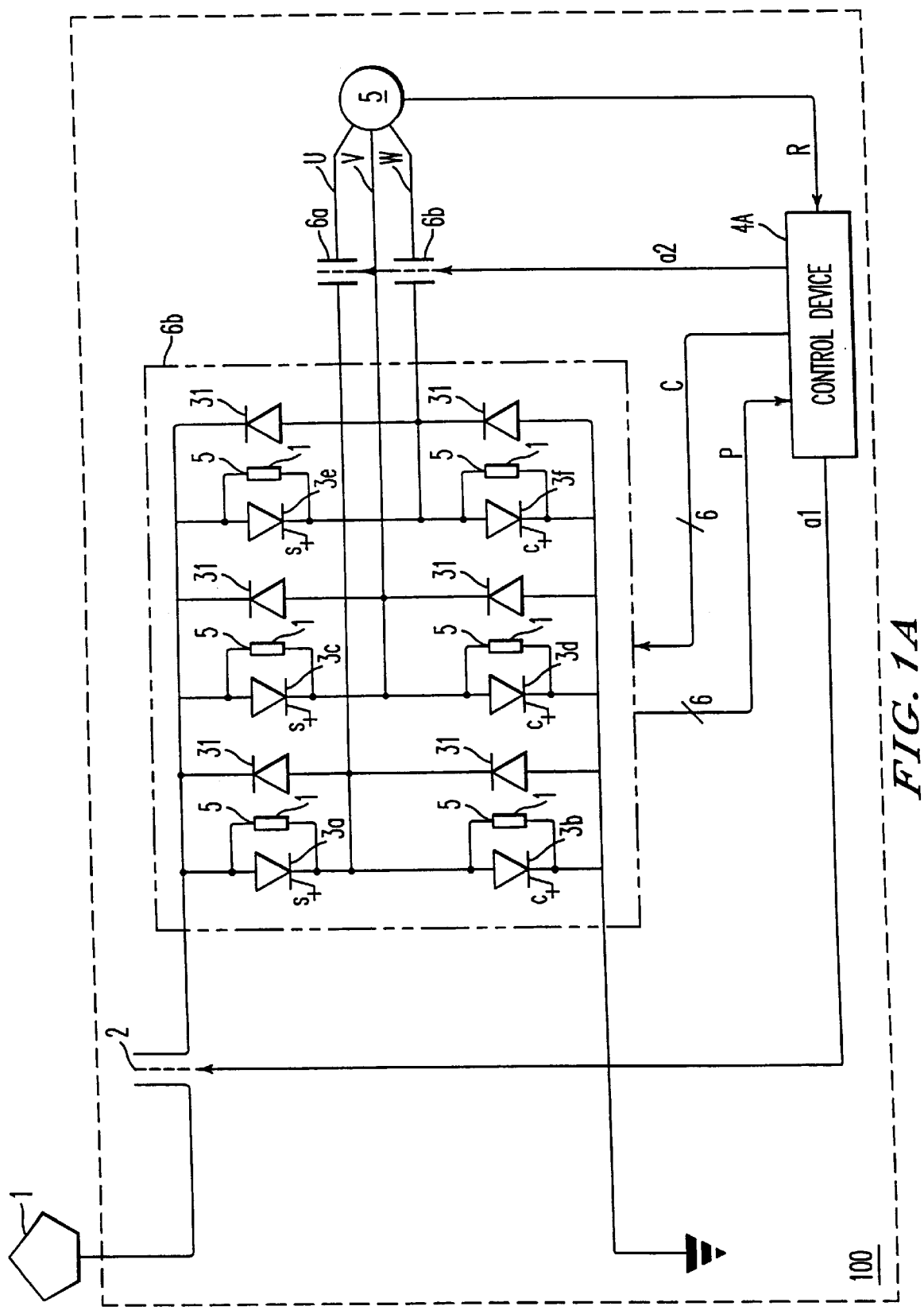
FIG. 1A is a schematic diagram showing an electric vehicle control system according to a first embodiment of this invention.

Referring now to the drawings, wherein like reference numerals designate identical or corresponding parts throughout the several views, the embodiments of this invention will be described below.

FIG. 1 A is a schematic diagram showing an electric vehicle control system 100 according to a first embodiment of this invention. In FIG. 1A, DC power collected from the overhead power line (not illustrated) via pantograph 1 passes through a breaker 2 which switches the current ON and OFF. Then, the DC power is converted to a variable voltage variable frequency AC power by inverter 3, and is supplied to PM motor 5 which is used in an M car of an electric vehicle (see FIG. 1C). A control device 4A receives information P from sensors S mounted in inverter 3 and information R, such as a speed of revolution and an angle of rotation of PM motor 5. Then, based on information R, control device 4A calculates the inverter frequency and the motor voltage, and outputs these as control signal C. Inverter 3 is controlled based on this control signal C. Inverter 3 is composed of semiconductor devices 3a–3f and diodes 31 respectively connected in an anti-parallel fashion with semiconductor devices 3a–3f.

Figure 2:
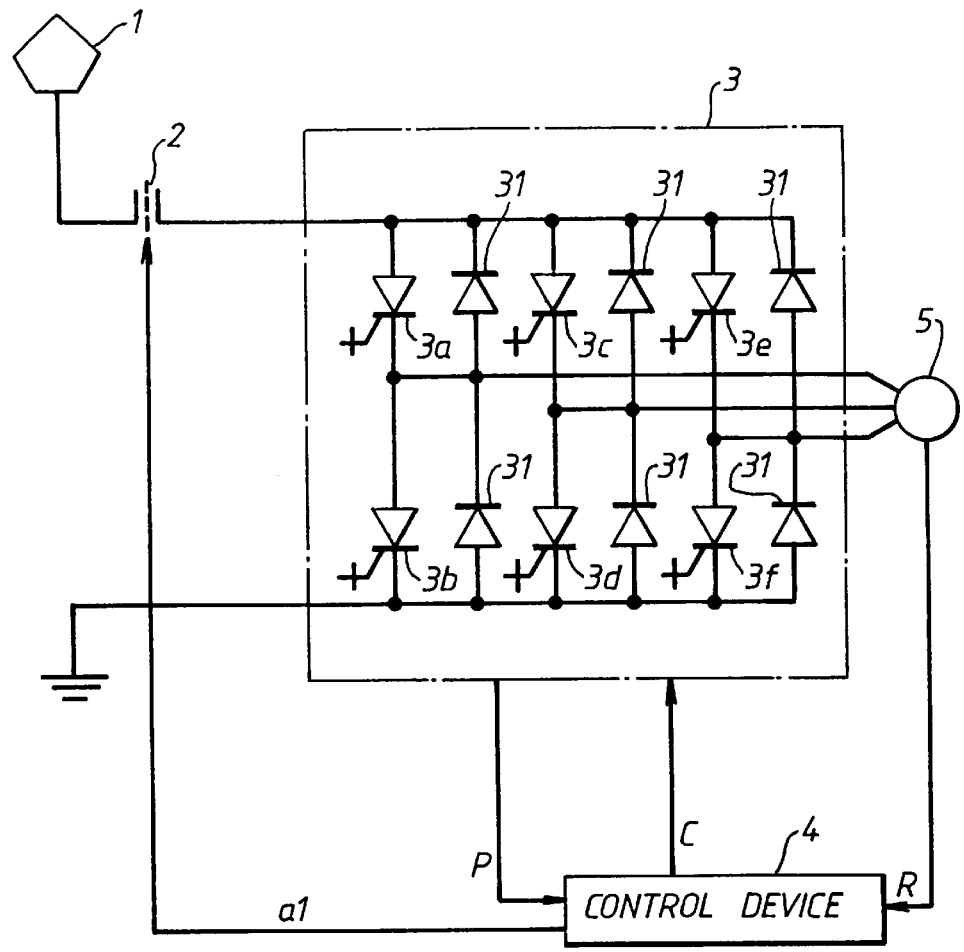
FIG. 2 is a schematic diagram showing a prior art electric vehicle control system.
Figure 3:
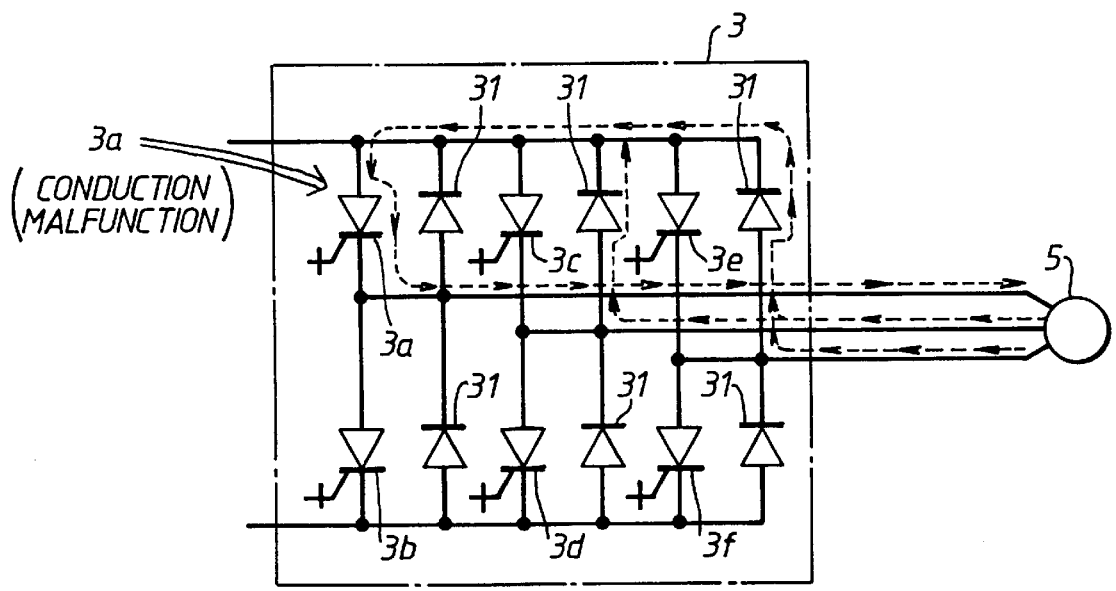
FIG. 3 is a drawing to illustrate the operation of the electric vehicle control system shown in FIG. 2.

Contrary to the prior art shown in FIG. 2, PM motor 5 is not directly connected to the 3-phase AC output terminals of inverter 3 via the three phase output lines U, V and W. Instead, devices 6a and 6b, such as contactors, semiconductor devices, or fuses, are respectively connected to the output lines of two phases, for example output lines U and W, of the three phase output lines U, V and W. Devices 6a and 6b are normally closed. They are opened by an opening instruction a2 (described later) from control device 4A.

If any one, or multiple, semiconductor devices of semiconductor devices 3a–3f are in a conduction malfunction state, PM motor 5 operates as a generator, even when there is no power supply from inverter 3, as described above.

One example of detecting a conduction malfunction of semiconductor devices 3a–3f is described below. Sensors S are respectively supplied for semiconductor devices 3a–3f. Each sensor S detects the voltage between the anode and cathode of one of semiconductor devices 3a–3f, respectively. Sensors S send these detected voltages as information P to control device 4A.

Control device 4A receives information P, and judges whether or not the detected voltages are zero voltages during the time gate-off signals C are applied to semiconductor devices 3a–3f, respectively. When the detected voltage of any one of semiconductor devices 3a–3f is zero, control device 4A determines that such semiconductor device is in a conduction malfunction state.

When control device 4A detects a conduction malfunction of semiconductor devices 3a–3f via information P from sensors S mounted in inverter 3, control device 4A outputs opening instruction al for line breaker 2 and an opening instruction a2 for devices 6a and 6b. Then, line breaker 2 opens. Furthermore, 3-phase output lines U and W between inverter 3 and PM motor 5 are respectively opened by devices 6a and 6b. Therefore, the flow of shortcircuit currents between the phases of PM motor 5 can be prevented.

In this embodiment, devices 6a and 6b are respectively provided in 3-phase lines U and W between inverter 3 and PM motor 5. This is because, since the sum of the 3-phase currents is always zero, if the output lines U and W of the 3-phase output lines U, V and W are respectively opened by devices 6a and 6b, current does not flow in the remaining phase output line V either. That is to say, the output lines of at least two phases out of the 3-phase output lines U, V and W may be opened. Therefore, it goes without saying that even if opening devices such as devices 6a and 6b are provided in all the 3-phase output lines U, V and W, the same effect as in this embodiment will be obtained.

Therefore, when using this embodiment, even in a case when one or more of semiconductor devices 3a–3f which compose inverter 3 malfunction, it is possible, electrically, to open only PM motor 5 which is driven by malfunctioning inverter 3. Therefore, the electric vehicle can continue to be operated by other fault-free electric vehicle control systems. Furthermore, malfimctioning inverter 3 and PM motor 5 connected to malfunctioning inverter 3 can be protected from burning out and so on.

Also, devices 6a and 6b, such as contactors, have been used as the devices for opening the 3-phase output lines U, V and W which connect PM motor 5 and inverter 3. However, the same effect can be expected by substituting non-contact systems which use semiconductor devices for devices 6a and 6b or by substituting overcurrent fuses for devices 6a and 6b.

In the above-described embodiment, devices 6a and 6b are respectively connected to the output lines of two phases U and W. This invention is not limited to this embodiment. Instead, it is possible to provide devices 6a and 6b in two lines U and W inside the PM motor 5.

Furthermore, in this embodiment, the case of an electric vehicle in which one PM motor 5 is controlled by one inverter 3 has been described. However, this invention is not limited to this embodiment. This invention is related to an individual PM motor. Therefore, this invention applies to a control system for an electric vehicle in which multiple PM motors 5 are controlled by one inverter or multiple PM motors 5 are controlled by multiple inverters 3 as in the second embodiment shown in FIG. 1B. In this case, the same effect can be obtained by providing opening devices 6a and 6b for respective PM motors 5, as shown in FIG. 1B.

Also, in the above-described embodiment, opening the opening devices 6a and 6b has only been described for a case of one inverter 3 malfunctioning. However, this invention is not limited to this embodiment. This invention also applies to a case when one inverter 3 is stopped during electric vehicle operation, such as during coasting operation, by an operating instruction (not illustrated). This invention is also applies to a case when some of the electric vehicle control systems (i.e., inverter 3 and controller 4A make up a control system in FIG. 1B) are stopped by an operating instruction when there is comparatively little acceleration or deceleration. In FIG. 1B, when inverter 3(A) is to be stopped, devices 6a and 6b of inverter 3(A) are opened and the operation of inverter 3(B) through 3(D) is continued. In these cases, the effect that the flow of unnecessary current into inverter 3 is prevented can be expected.

Figure 1B:
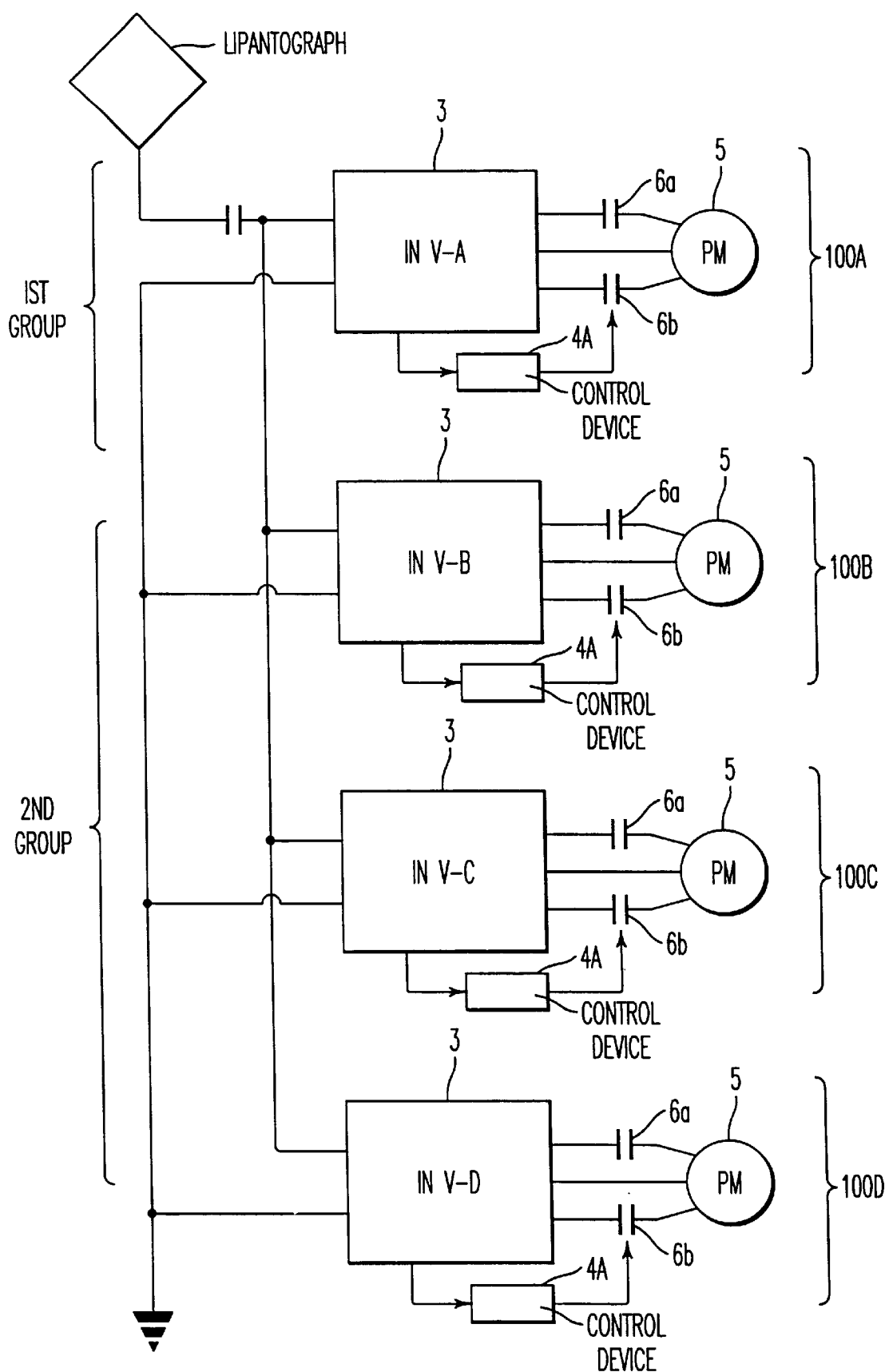
FIG. 1B is a schematic diagram showing an electric vehicle control system according to a second embodiment of this invention.
Figure 1C:
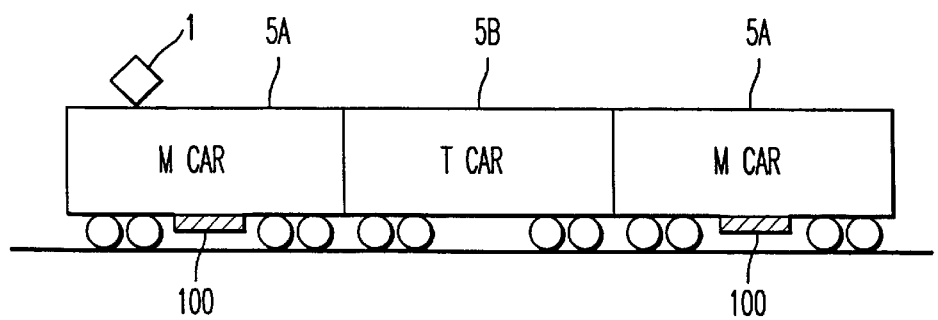
FIGS. 1C and 1D are schematic diagrams showing electric vehicle control systems of FIGS. 1A and 1B installed in an electric vehicle.
Figure 1D:
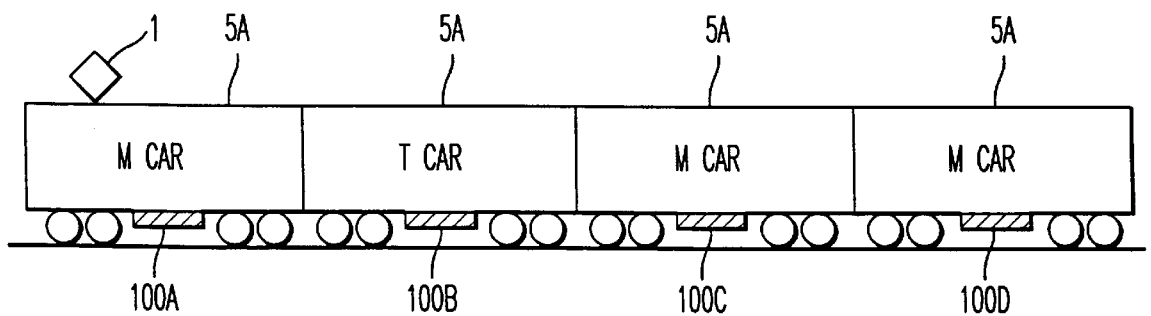

FIGS. 1C and 1D show electric vehicles composed of cars loaded with PM motors (M cars 5A) and cars without PM motors (T cars 5B). In actual application various combinations of M cars and T cars are possible and FIGS. 1C and 1D merely illustrate two such possible combinations. As shown in FIGS. 1C and 1D, the M cars 5A of FIG. 1C include electric control system 100 of FIG. 1A and the M cars 5A of FIG. 1D include electric control systems 100A–100D of FIG. 1B. The electric control systems 100 and 100A–D provide power to wheels of the M cars 5A of the electric vehicles of FIGS. 1C and 1D, respectively.

When using this invention as described above, it is possible to provide an electric vehicle control system which can continue the operation of the electric vehicle even in a case when one inverter of the electric vehicle control system of FIG. 1B is in a malfunctioning state.

Furthermore, it is possible to provide an electric vehicle control system which, even in a case when one inverter 3 of the electric vehicle control system is in a malfunction state, can protect the malfunctioning inverter 3 and a PM motor 5 connected to the malfunctioning inverter 3 for driving the electric vehicle.

It is also possible to provide an electric vehicle control system which can prevent the unnecessary current from flowing into the inverter 3 when at least one of the inverters 3 of FIG. 1B is stopped by an operating instruction during the electric vehicle operation.

Obviously, numerous modifications and variations of the present invention are possible in light of the above teachings. It is therefore to be understood that within the scope of the appended claims, the invention may be practiced otherwise than as specifically described herein.

What is claimed is:

1. An electric vehicle control system for controlling an electric vehicle, comprising:
   a pantograph configured to receive DC power from an overhead power line;
   an inverter adapted to receive DC power from the pantograph and configured to convert said DC power into three-phase AC power, said inverter including a plurality of semiconductor devices and a corresponding plurality of sensors configured to detect voltages across respective of said semiconductor devices;
   a permanent magnet synchronous motor coupled to said inverter and configured to receive said three-phase AC power from said inverter for driving said electric vehicle;
   control means for generating an opening signal when one of said plurality of sensors detects zero voltage across one of said semiconductor devices during application of gate-off signals to the semiconductor devices while said permanent magnet synchronous motor continues to rotate; and
   opening means for opening the connection between said inverter and said permanent magnet synchronous motor and for cutting off a circulating current generated by the continued rotation of said permanent magnet synchronous motor, in response to receiving the opening signal from the control means.

2. The electric vehicle control system according to claim 1:
   wherein three-phase output terminals of said inverter are connected to three-phase input terminals of said permanent magnetic synchronous motor through three-phase output lines;
   said opening means includes at least two opening devices provided in at least two phase output lines out of said three-phase output lines, respectively; and
   said opening devices are opened by said opening signal from said control means, thereby opening the connection between said inverter and said permanent magnetic synchronous motor.

3. The electric vehicle control system according to claim 1, wherein:
   three-phase output terminals of said inverter are connected to three-phase input terminals of said permanent magnetic synchronous motor;
   said opening means includes at least two opening devices provided in at least two phase input lines inside of said permanent magnetic synchronous motor; and
   said opening devices are opened by said opening signal from said control means, thereby opening the connection between said inverter and said permanent magnetic synchronous motor.

4. The electric vehicle control system according to claim 1, wherein:
   said control means generates said opening signal when said control means receives an operating instruction for stopping said inverter during when said electric vehicle is in coasting operation; and
   said opening means opens the connection between said inverter and said permanent magnetic synchronous motor based on said opening signal from said control means, thereby opening the connection between said inverter and said permanent magnetic synchronous motor.

5. A method for controlling an electric vehicle, comprising:
   receiving DC power from an overhead power line;
   converting the DC power into three-phase AC power with an inverter that includes a plurality of semiconductor devices;
   detecting voltages across respective of a plurality of semiconductor devices with a corresponding plurality of sensors;
   supplying the three-phase AC power to a permanent magnet synchronous motor;
   driving the electric vehicle with the permanent magnet synchronous motor;
   generating an opening signal when one of the plurality of sensors detects zero voltage across one of the semiconductor devices during application of gate-off signals to the semiconductor devices while the permanent magnet synchronous motor continues to rotate; and opening the connection between the inverter and the permanent magnet synchronous motor to cut off a circulating current generated by the continued rotation of the permanent magnet synchronous motor, in response to receiving the opening signal.

\* \* \* \* \*